US011372149B2

(12) United States Patent
Meyer Timmerman Thijssen et al.

(10) Patent No.: US 11,372,149 B2
(45) Date of Patent: Jun. 28, 2022

(54) DEPTH-MODULATED SLANTED GRATINGS USING GRAY-TONE LITHOGRAPHY AND SLANT ETCH

(71) Applicant: Applied Materials, Inc., Santa Clara, CA (US)

(72) Inventors: Rutger Meyer Timmerman Thijssen, San Jose, CA (US); Ludovic Godet, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 16/662,086

(22) Filed: Oct. 24, 2019

(65) Prior Publication Data

US 2020/0142120 A1 May 7, 2020

Related U.S. Application Data

(60) Provisional application No. 62/756,988, filed on Nov. 7, 2018.

(51) Int. Cl.
*G02B 6/00* (2006.01)
*F21V 8/00* (2006.01)

(52) U.S. Cl.
CPC ......... *G02B 6/0016* (2013.01); *G02B 6/0038* (2013.01)

(58) Field of Classification Search
CPC .. G02B 6/0065; G02B 6/0016; G02B 6/0035; G02B 6/0038; G02B 27/0172
USPC ........................................................... 385/37
See application file for complete search history.

(56) References Cited

U.S. PATENT DOCUMENTS 6,522,403 B2 * 2/2003 Wilson ...................... G01J 3/02 356/328
6,545,808 B1 * 4/2003 Ehbets ................ G02B 5/1857 359/15
6,847,491 B1 1/2005 Jian et al.
7,481,565 B2 * 1/2009 Yu ........................ G02B 6/0038 362/615
8,236,481 B2 8/2012 Nottola et al.
10,534,115 B1 * 1/2020 Calafiore ................ H01J 37/20
10,649,141 B1 * 5/2020 Colburn .............. H01L 21/0274
11,067,726 B2 * 7/2021 Colburn ................ G03F 7/0002

(Continued)

FOREIGN PATENT DOCUMENTS

JP 61-241712 * 10/1986 ............... G02B 6/34
JP 62-296102 * 12/1987 ............ G02B 6/124

(Continued)

OTHER PUBLICATIONS

International Search Report and Written Opinion for International Application No. PCT/US2019/057517 dated Feb. 10, 2020.

(Continued)

*Primary Examiner* — Robert Tavlykaev
(74) *Attorney, Agent, or Firm* — Patterson + Sheridan, LLP

(57) ABSTRACT

An apparatus with a grating structure and a method for forming the same are disclosed. The grating structure includes forming a wedge-shaped structure in a grating layer using a grayscale resist and photo lithography. A plurality of channels is formed in the grating layer to define slanted grating structures therein. The wedge-shaped structure and the slanted grating structures are formed using a selective etch process.

17 Claims, 11 Drawing Sheets

300

302 Deposit etch stop and grating material on a substrate
304 Deposit grayscale resist and perform photo lithography
306 Transfer etch into grating material
308 Deposit hardmask
310 Deposit optical planarization layer and photoresist layer
312 Perform lithography and etch hardmask
314 Strip optical planarization layer and photoresist layer
316 Slant etch
318 Strip hardmask

(56) References Cited

U.S. PATENT DOCUMENTS 11,175,455 B1 * 11/2021 Colburn ............... G02B 5/1857
2002/0122255 A1 9/2002 Ogusu et al.
2005/0078912 A1 * 4/2005 Iazikov .................. G02B 6/124 385/37
2011/0038049 A1 * 2/2011 Vallius ................. G02B 5/1809 359/575
2011/0075970 A1 3/2011 Schrauwen et al.
2012/0206937 A1 8/2012 Travis et al.
2013/0136396 A1 * 5/2013 Kim ......................... G02B 6/34 385/37
2014/0270642 A1 * 9/2014 Frish ........................ G02B 6/34 385/37
2015/0118832 A1 * 4/2015 Wood ................ H01L 21/31122 438/514
2015/0348787 A1 * 12/2015 Cai .................. H01L 21/28035 257/368
2016/0033784 A1 * 2/2016 Levola ................. G02B 6/0058 385/37
2017/0003504 A1 1/2017 Vallius et al.
2017/0200614 A1 * 7/2017 Mahajan ............. H01L 29/0657
2018/0052276 A1 * 2/2018 Klienman ............ G02B 5/3025
2018/0095201 A1 * 4/2018 Melli ..................... G02B 6/124
2019/0137777 A1 * 5/2019 Yang .................. G02B 27/4255
2019/0258008 A1 * 8/2019 Hautala .................... G02B 6/34
2019/0324202 A1 * 10/2019 Colburn ............... G02B 5/1857
2020/0033530 A1 * 1/2020 Colburn .............. H01J 37/3171
2020/0408969 A1 * 12/2020 Yoon ......................... G03F 1/00

FOREIGN PATENT DOCUMENTS

KR 10-2014-0039584 A 4/2014
KR 10-2014-0078184 A 6/2014
WO 99/64929 A1 12/1999
WO 2018/039271 A1 3/2018

OTHER PUBLICATIONS

Taiwan Office Action dated Apr. 8, 2021 for Application No. 108138019.

Chinese Office Action dated Sep. 7, 2021 for CN Application No. 201980073438.3.

Victor A. Soifer, “Methods for Computer Design of Diffractive Optical Elements,” Apr. 30, 2007, pp. 226-234.

Chinese Office Action dated Mar. 30, 2022 for Application No. 201980073438.3.

Taiwan Office Action dated Mar. 30, 2022 for Application No. 110137509.

* cited by examiner

DEPTH-MODULATED SLANTED GRATINGS USING GRAY-TONE LITHOGRAPHY AND SLANT ETCH

CROSS-REFERENCE TO RELATED APPLICATIONS

This application claims priority to U.S. Provisional Patent Application No. 62/756,988, filed Nov. 7, 2018, the entirety of which is herein incorporated by reference.

BACKGROUND

Field

Embodiments of the present disclosure generally relate to a method and apparatus for use in a display apparatus. More specifically, the disclosure relates to a grating structure for use in a waveguide or other applications.

Description of the Related Art

Virtual reality is generally considered to be a computer generated simulated environment in which a user has an apparent physical presence. A virtual reality experience can be generated in 3D and viewed with a head-mounted display (HMD), such as glasses or other wearable display devices that have near-eye display panels as lenses to display a virtual reality environment that replaces an actual environment.

Augmented reality, however, enables an experience in which a user can still see through the display lenses of the glasses or other HMD device to view the surrounding environment, yet also see images of virtual objects that are generated for display and appear as part of the environment. Augmented reality can include any type of input, such as audio and haptic inputs, as well as virtual images, graphics, and video that enhances or augments the environment that the user experiences. As an emerging technology, there are many challenges and design constraints with augmented reality.

One such challenge is displaying a virtual image overlaid on an ambient environment with an image having sufficient clarity from various user viewing perspectives. For example, if a user's eye is not precisely aligned with the virtual image being displayed, the user may view a distorted, unclear image or may not be able to view the image entirely. Moreover, the image may be blurry and have less than desirable resolution from a non-optimal viewing angle.

Therefore, there is a need for improved methods of manufacturing augmented reality display devices.

SUMMARY

The present disclosure generally relates to a method and apparatus for use in a display apparatus or in other applications. More specifically, the disclosure relates to a grating structure for use in a waveguide created using grayscale lithography. The method herein may also form a waveguide structure that is used as a master for nano-imprint lithography.

In one embodiment, a waveguide structure is provided. The structure has a substrate having a grating layer thereon, where a wedge-shaped structure is formed in the grating layer via grayscale lithography. The wedge-shaped structure has a first end, a second end, and a depth, where the depth changes from the first end to the second end. The waveguide structure also has a plurality of channels formed in the grating layer, each channel partially defining a portion of a plurality of grating structures, where a depth of the plurality of grating structures changes from the first end of the wedge-shaped structure to the second end of the wedge-shaped structure.

In another embodiment, a waveguide structure is provided. The waveguide structure includes a substrate having a grating layer thereon. The waveguide structure also includes a wedge-shaped structure formed in the grating layer, where the wedge-shaped structure has a depth that changes in at least a first direction and a second direction that defines a three dimensional shape. The waveguide structure also includes a plurality of channels formed in the grating layer, each channel partially defining a portion of a plurality of grating structures, where a depth of the plurality of grating structures changes in the first direction and the second direction as defined by the wedge-shaped structure.

In yet another embodiment, a method of forming a waveguide structure is provided. The method includes forming a wedge-shaped structure in a grating layer using grayscale lithography. The method also includes forming a hardmask and a photoresist stack over the grating layer. The method further includes etching the photoresist stack. The method also includes forming a plurality of grating structures in the grating layer.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, as the disclosure may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

An apparatus with a grating structure and a method for forming the same are disclosed. The strength of the grating may be altered along the length of the grating by changing the height of the gratings. To accomplish this, a method includes forming a depth-modulated wedge-shaped structure in a grating layer using gray-tone lithography. A plurality of channels is formed in the grating layer to define slanted grating structures therein. The wedge-shaped structure and the slanted grating structures are formed using a selective etch process. The method described herein can also be used to create a waveguide structure that functions as a master for nanoimprint lithography.

Figure 1:
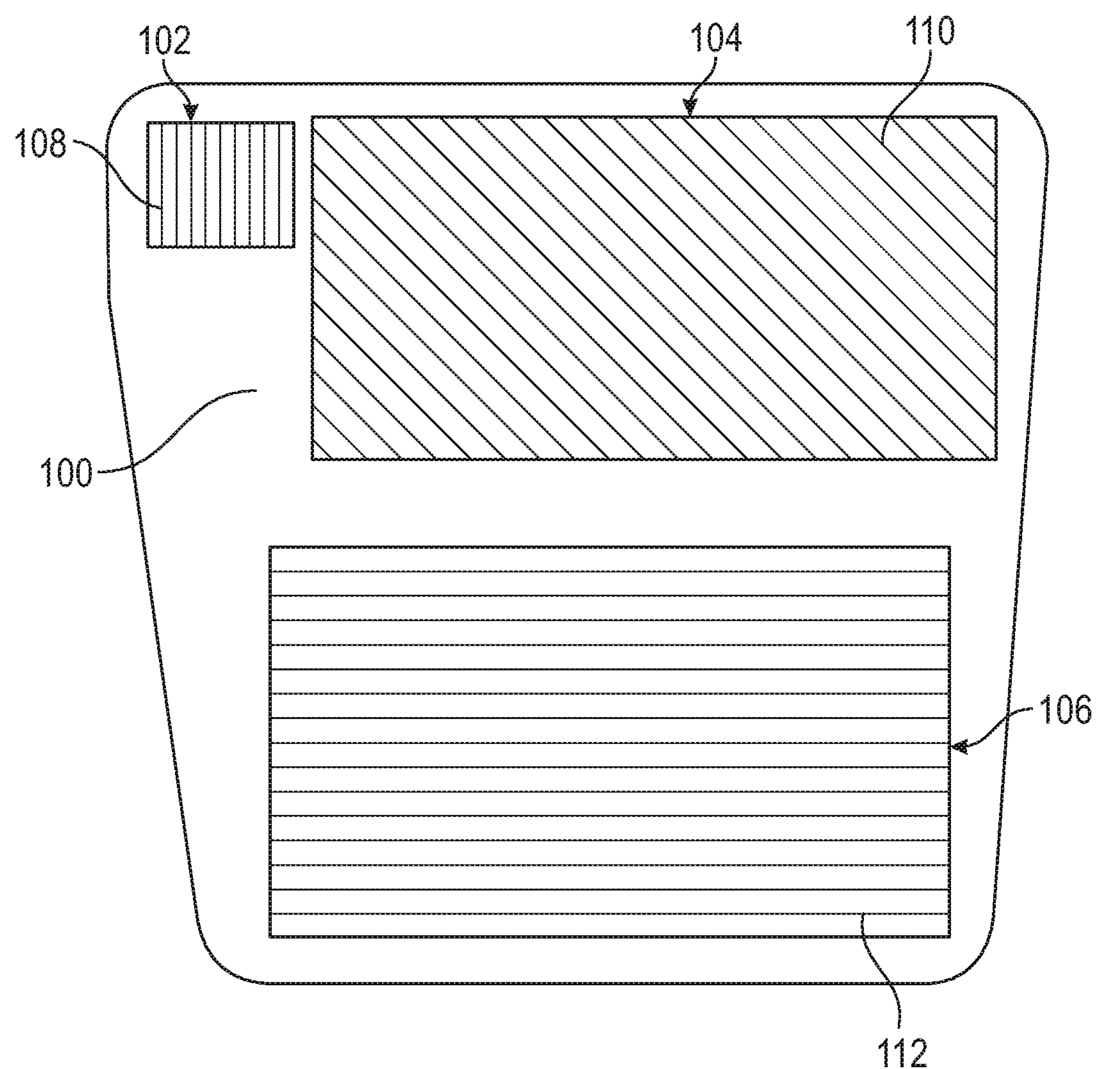
FIG. 1 is a perspective, frontal view of a waveguide combiner according to one embodiment.

FIG. 1 is a perspective, frontal view of a waveguide combiner 100. It is to be understood that the waveguide combiner 100 described below is an exemplary waveguide combiner. The waveguide combiner 100 includes an input coupling region 102 defined by a plurality gratings 108, an intermediate region 104 defined by a plurality of gratings 110, and an output coupling region 106 defined by a plurality of gratings 112. The input coupling region 102 receives incident beams of light (a virtual image) having an intensity from a microdisplay. Each grating of the plurality of gratings 108 splits the incident beams into a plurality of modes, each beam having a mode. Zero-order mode (T0) beams are refracted back or lost in the waveguide combiner 100, positive first-order mode (T1) beams are coupled though the waveguide combiner 100 to the intermediate region 104, and negative first-order mode (T−1) beams propagate in the waveguide combiner 100 a direction opposite to the T1 beams. Ideally, the incident beams are split into T1 beams that have all of the intensity of the incident beams in order to direct the virtual image to the intermediate region 104. One approach to split the incident beam into T1 beams that have all of the intensity of the incident beams is to optimize the slant angle of each grating of the plurality of gratings 108 to suppress the T−1 beams and the T0 beams. The T1 beams undergo total-internal-reflection (TIR) through the waveguide combiner 100 until the T1 beams come in contact with the plurality of gratings 110 in the intermediate region 104. A portion of the input coupling region 102 may have gratings 108 with a slant angle different than the slant angle of gratings 108 from an adjacent portion of the input coupling region 102.

The T1 beams contact a grating of the plurality of gratings 110. The T1 beams are split into T0 beams refracted back or lost in the waveguide combiner 100, T1 beams that undergo TIR in the intermediate region 104 until the T1 beams contact another grating of the plurality of gratings 110, and T−1 beams that are coupled through the waveguide combiner 100 to the output coupling region 106. The T1 beams that undergo TIR in the intermediate region 104 continue to contact gratings of the plurality of gratings 110 until the either the intensity of the T1 beams coupled through the waveguide combiner 100 to the intermediate region 104 is depleted, or remaining T1 beams propagating through the intermediate region 104 reach the end of the intermediate region 104. The plurality of gratings 110 must be tuned to control the T1 beams coupled through the waveguide combiner 100 to the intermediate region 104 in order to control the intensity of the T−1 beams coupled to the output coupling region 106 to modulate a field of view of the virtual image produced from the microdisplay from a user's perspective and increase a viewing angle from which a user can view the virtual image. One approach to control the T1 beams coupled through the waveguide combiner 100 to the intermediate region 104 is to optimize the slant angle of each grating of the plurality of gratings 110 to control the intensity of the T−1 beams coupled to the output coupling region 106. A portion of the intermediate region 104 may have gratings 110 with a slant angle different than the slant angle of gratings 110 from an adjacent portion of the intermediate region 104. Furthermore, the gratings 110 may have slant angles different than the slant angles of the gratings 108.

The T−1 beams pass through the waveguide combiner 100 to the output coupling region 106 and undergo TIR in the waveguide combiner 100 until the T−1 beams contact a grating of the plurality of gratings 112 where the T−1 beams are split into T0 beams that are refracted back or lost in the waveguide combiner 100, T1 beams that undergo TIR in the output coupling region 106 until the T1 beams contact another grating of the plurality of gratings 112, or T−1 beams that pass out of the waveguide combiner 100. The T1 beams that undergo TIR in the output coupling region 106 continue to contact gratings of the plurality of gratings 112 until the either the intensity of the T−1 beams pass through the waveguide combiner 100 to the output coupling region 106 is depleted, or remaining T1 beams propagating through the output coupling region 106 have reached the end of the output coupling region 106. The plurality of gratings 112 must be tuned to control the T−1 beams passed through the waveguide combiner 100 to the output coupling region 106 in order to control the intensity of the T−1 beams passed out of the waveguide combiner 100 to further modulate the field of view of the virtual image produced from the microdisplay from the user's perspective and further increase the viewing angle from which the user can view the virtual image. One approach to control the T−1 beams passed through the waveguide combiner 100 to the output coupling region 106 is to optimize the slant angle of each grating of the plurality of gratings 112 to further modulate the field of view and increase the viewing angle. A portion of the output coupling region 106 may have gratings 112 with a slant angle different than the slant angle of gratings 112 from an adjacent portion of the output coupling region 106. Furthermore, the gratings 112 may have slant angles different than the slant angles of the gratings 108 and the gratings 110.

The depth of the gratings 108, 110, or 112 may vary across the coupling or intermediate regions in embodiments described herein. In some embodiments, the depth of the gratings may vary smoothly over the grating area. In one example embodiment, the depth may range from about 10 nm to about 400 nm across the grating area. The grating area in an example embodiment can range from approximately 20 mm to approximately 50 mm on a given side. Therefore, as one example, the angle of the change in the depth of the gratings may be on the order of 0.0005 degrees.

In embodiments described herein, the depth-modulated gratings may be created using gray-tone lithography, also known as grayscale lithography. Grayscale lithography is a one-step process used to create three-dimensional microstructures in a photoresist layer using an optical gray-tone (or grayscale) mask. Grayscale masks let varying amounts of light pass through to create depth-modulated gratings. Using grayscale lithography to create depth-modulated gratings allows for fewer processing operations and higher wedge resolution than existing methods.

The methods described herein may also be used in other embodiments to create a waveguide structure that is used as a master for nanoimprint lithography. In those embodiments, the grating materials do not need to have optical properties like they do for grating structures used in waveguide applications. In nanoimprint lithography applications, the stack materials may be chosen for their etch properties and for stamp release performance, rather than optical performance. While some of the embodiments described herein relate to waveguides, the methods and structures are also applicable to nanoimprint lithography.

Figure 2:
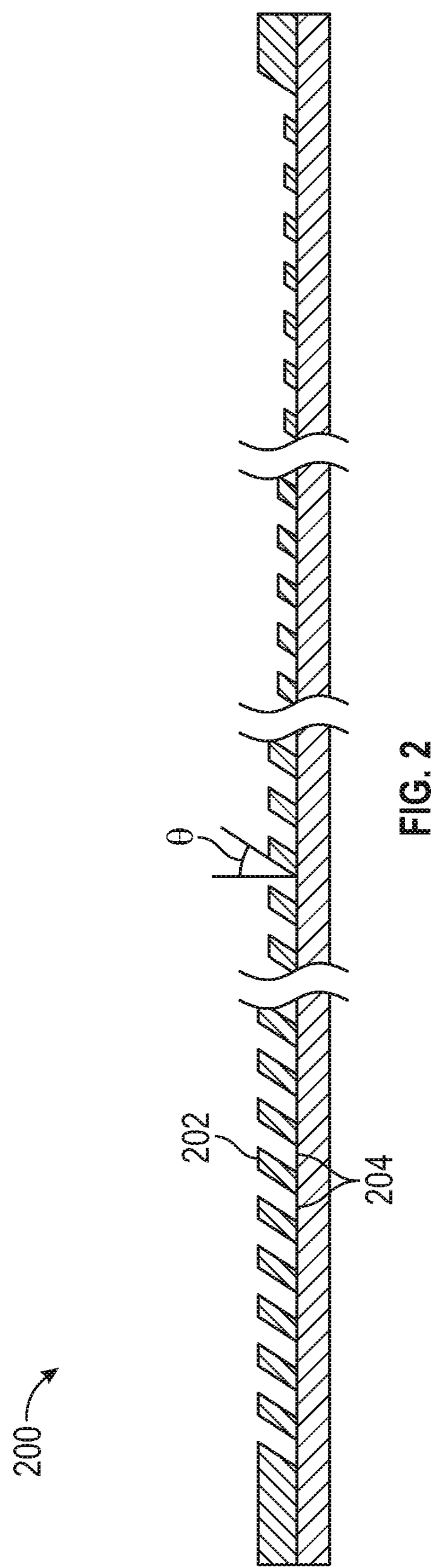
FIG. 2 is an illustration of depth-modulated slanted gratings according to an embodiment.

FIG. 2 is an illustration of depth-modulated slanted gratings 200 according to an embodiment. Because of the relative sizes of the length of the grating area compared to the height of the gratings 202, a scale drawing is not possible. For example, if the length of the grating is 25 mm, and the change in grating depth is 250 nm from one end of the grating area to the other end, then the angle ϑ of the grating is arctan(y/x), or 0.000573°. Therefore, the structure locally appears to be effectively flat.

As seen in FIG. 2, in this embodiment, the gratings 202 vary in height, with the taller gratings on the left of the figure. The gratings 202 get shorter in size as they move to the right edge of the waveguide. In other embodiments, the grating height may vary along the waveguide in any suitable manner. For example, the taller gratings may be on the right and the shorter gratings on the left in another embodiment. In yet another embodiment, shorter gratings may be present on the left and right sides of the waveguide with taller gratings in the middle. In yet another embodiment, taller gratings may be present on the sides of the waveguide with shorter gratings in the middle. In other embodiments, the grating height may vary in any linear or nonlinear fashion. In addition, the grating height may vary along multiple dimensions, not just from left to right along the waveguide. Any one-dimensional or two-dimensional shape or pattern may be used to shape the grating height of the waveguide using gray-tone lithography. As one example, a concave or convex pattern may be used. Additionally, each slanted grating structure in the gratings 202 can have an angle theta measured relative to a plane that is normal to the surface of the etch stop layer. The angle theta is, for example, about 0 degrees and about 70 degrees.

As seen in FIG. 2, a portion of the gratings 202 are at least partially defined by a plurality of channels 204 formed in the waveguide. The plurality of channels 204 can be formed using gray-tone lithography. In some embodiments, the process used to form the plurality of channels 204 is the same process used to create the gratings 202.

Figure 3:
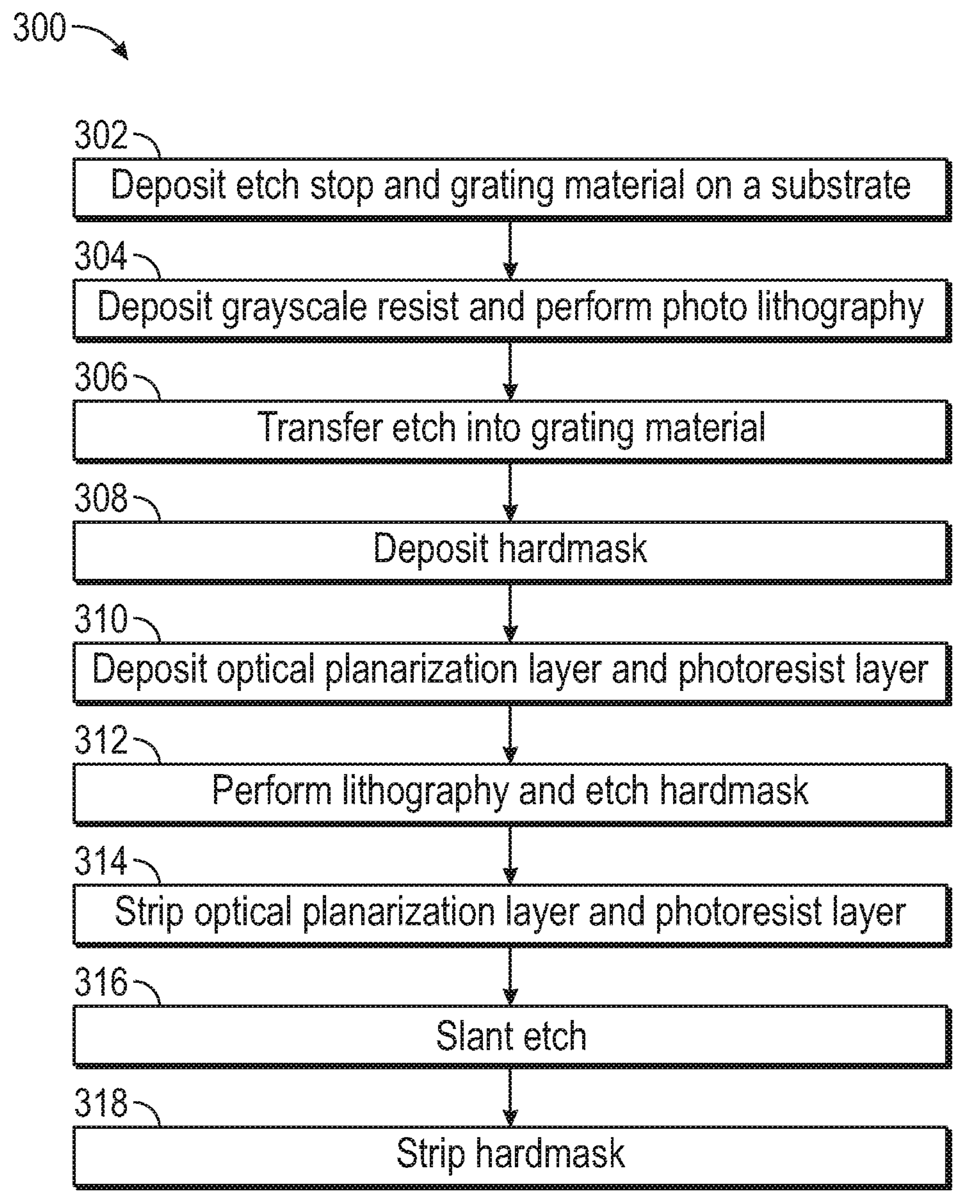
FIG. 3 is a flow chart of a method of manufacturing a waveguide structure according to one embodiment.

FIG. 3 is a flow diagram of a method 300 for forming a waveguide structure 400 as shown in FIGS. 4A-4H. FIGS. 4A-4H are not to scale. The waveguide structure is generally formed on a substrate. In one example, the substrate is a silicon-based glass substrate with an optional etch stop layer and a grating layer formed thereon. In another example, the substrate is a glass substrate without an etch stop layer. In such cases, the substrate functions as the grating layer and the grating structures are formed directly in the substrate.

Figure 4A:
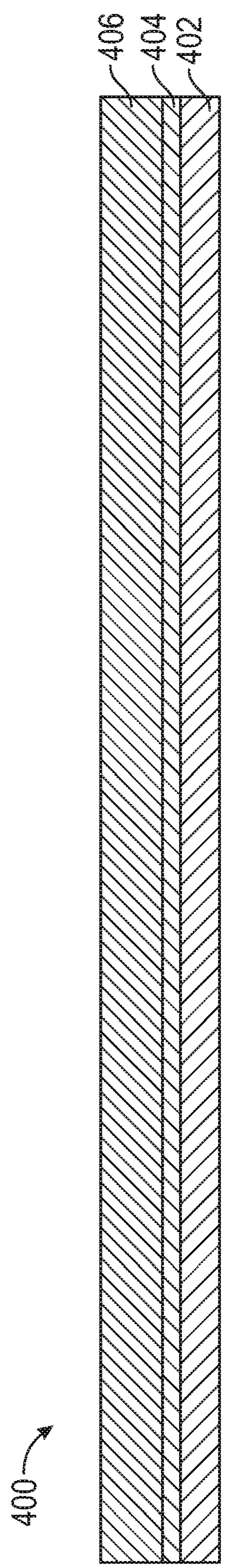
FIGS. 4A-4H are schematic, cross-sectional views of a portion of a waveguide structure according to an embodiment.

At operation 302, an etch stop layer and a fin material layer are deposited on a substrate. The results of operation 302 are illustrated in FIG. 4A. FIG. 4A is an enlarged portion, in cross-section, of a waveguide structure 400 for forming grating structures therein. In this example, the waveguide structure 400 has a substrate 402 with an etch stop layer 404 formed thereon. The substrate 402 is made from an optically transparent material, such as silicon, titanium nitride, or chromium. The etch stop layer 404 is formed over the substrate 402. The etch stop layer 404 is formed, for example, by a chemical vapor deposition (CVD) process, a physical vapor deposition (PVD) process, or a spin-on process. The etch stop layer 404 is formed from a material, such as titanium nitride or tantalum nitride, among others, which is resistant to an etching process.

A grating layer 406 (i.e., a fin material layer) is formed over the etch stop layer 404. The grating layer 406 is formed from an optically transparent material. In one example, the grating layer 406 is formed from a silicon-based material, such as silicon nitride or silicon oxide, or a titanium-based material, such as titanium oxide. The material of the grating layer 406 has a high refractive index, such as about 1.3 or higher, like 1.5, or even higher. Generally, the grating layer 406 generally has a thickness less than about 1 micrometer, such as about 150 nm and 700 nm.

Figure 4B:
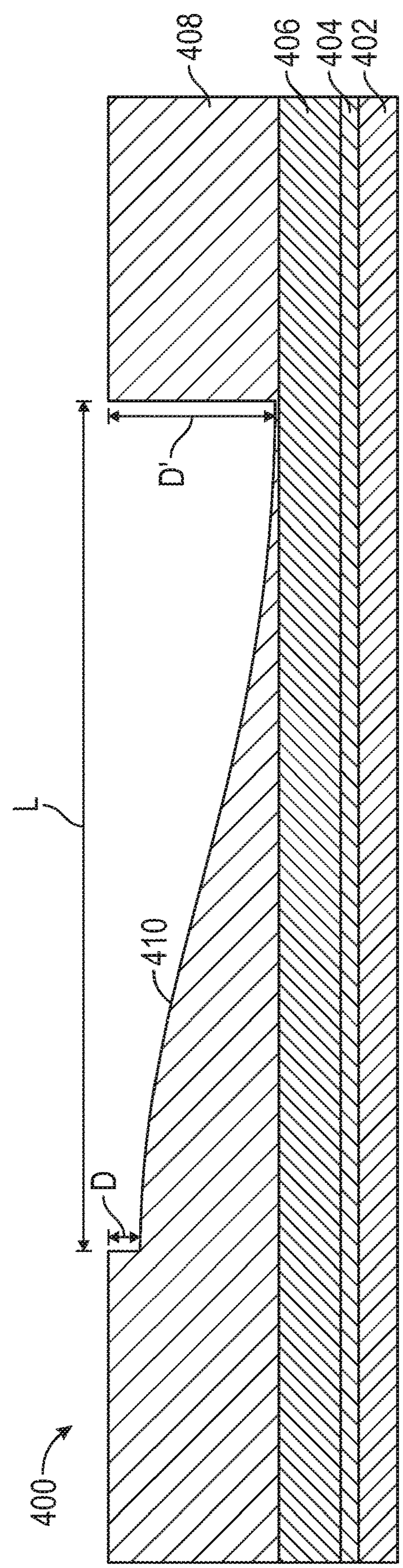

At operation 304, a grayscale resist is deposited and photo lithography is performed. The grayscale resist can be deposited in any pattern to produce the desired depth and shape of the waveguide structure. FIG. 4B illustrates the results of operation 304. Substrate 402, etch stop layer 404, and grating layer 406 are illustrated. Grayscale resist layer 408 is deposited on grating layer 406. In this example, photo lithography has been performed to create the shape of the waveguide structure 410 over the length L with a depth of D on the left side and a depth of D' on the right side. As described above, any desired one-, two-, or three-dimensional shape can be created in the grayscale resist using photo lithography.

Figure 4C:
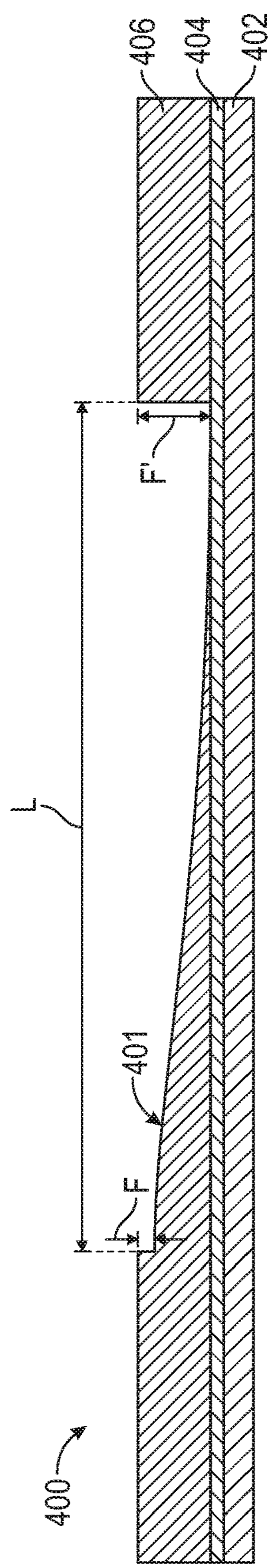

At operation 306, a transfer etch into the grating material is performed. The results of operation 306 are illustrated in FIG. 4C. In this example embodiment, the transfer etch produces a wedge-shaped structure 401 after photo lithography is performed that mirrors the structure of grayscale resist layer 408. In one embodiment, which can be combined with other embodiments, the grayscale resist layer is entirely removed and a similar wedge-shaped structure 401 to that of the waveguide structure 410 is created in the grating layer 406.

The wedge-shaped structure 401 in this example embodiment has a length L between a first end and a second end. The first end of the wedge-shaped structure 401 has a depth F and the second end has a depth F'. That is, the depth of the wedge-shaped structure 401 is minimal at the first end and maximum at the second end in this embodiment. The depth from F to F' generally is within a range of about 0 nm to about 700 nm. In this embodiment, the length L is substantially large compared to the depths F and F'. For example, the length L may be about 25 mm while the depth F at the first end is about 0 nm to about 50 nm and the depth F' at the second end is about 250 nm to about 700 nm. Accordingly, the wedge-shaped structure 401 has a substantially shallow slope. In this example, the angle of the slope is less than 1 degree, such as less than 0.1 degrees, like about 0.0005 degrees. The slope of the wedge-shaped structure 401 is illustrated herein with an exaggerated angle for clarity.

Figure 4D:
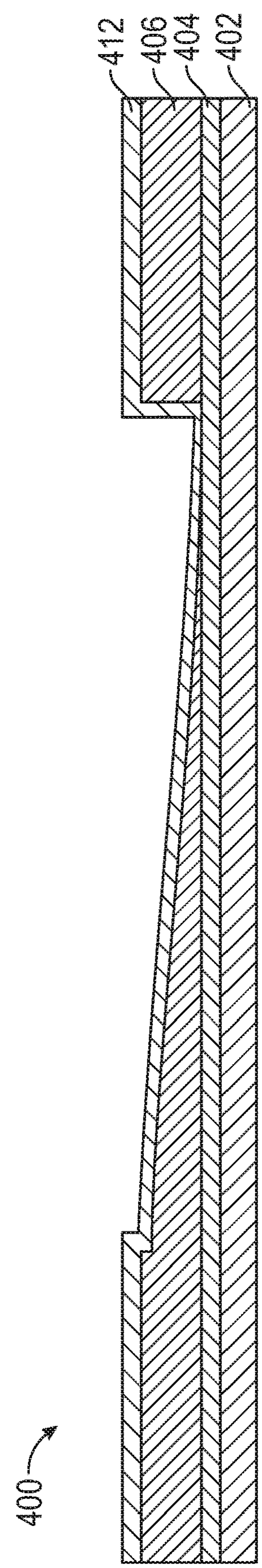

At operation 308 a conformal hardmask 412 is deposited onto the grating layer 406. The hardmask 412 is, for example, formed from titanium nitride using a CVD process or a PVD process. In one example, the hardmask 412 has a thickness of about 30 nm and about 50 nm. The results of operation 308 are illustrated in FIG. 4D. The conformal hardmask 412 can be deposited so that the thickness of the hardmask 412 is substantially uniform. In yet other embodiments, the conformal hardmask 412 can be deposited so that the thickness varies from about 30 nm and about 50 nm at varying points on the grating layer 406. The conformal hardmask 412 is deposited in such a way that the slope of the hardmask 412 is similar to the slope of the wedge shaped-structure 401.

At operation 310, an optical planarization layer 414 is formed over the hardmask 412 and a photoresist layer 416 is formed over the optical planarization layer 414. The photoresist layer 416 is formed from a polymeric material using, for example, a lithography process. In one example, the photoresist layer 416 is formed using a spin-on coating, exposing the grating lines, and developing the photoresist. The results of operation 310 are illustrated in FIG. 4E.

Figure 4E:
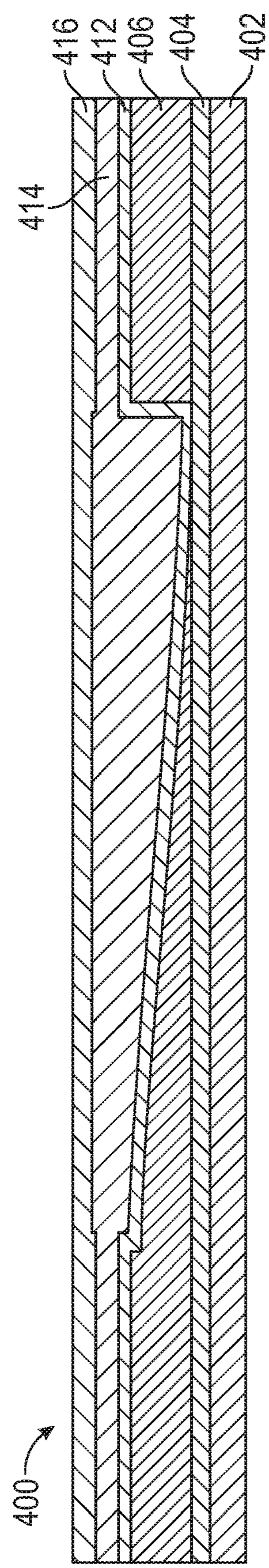

As shown in FIG. 4E, the optical planarization layer 414 varies in thickness, such that a substantially planar top surface is formed. The optical planarization layer 414 varies in thickness, such that the space between the sloped conformal hardmask 412 and the substantially planar top surface of the optical planarization layer 414 is completely filled and has a varying thickness over the sloped wedge shaped-structure 401.

Figure 4F:
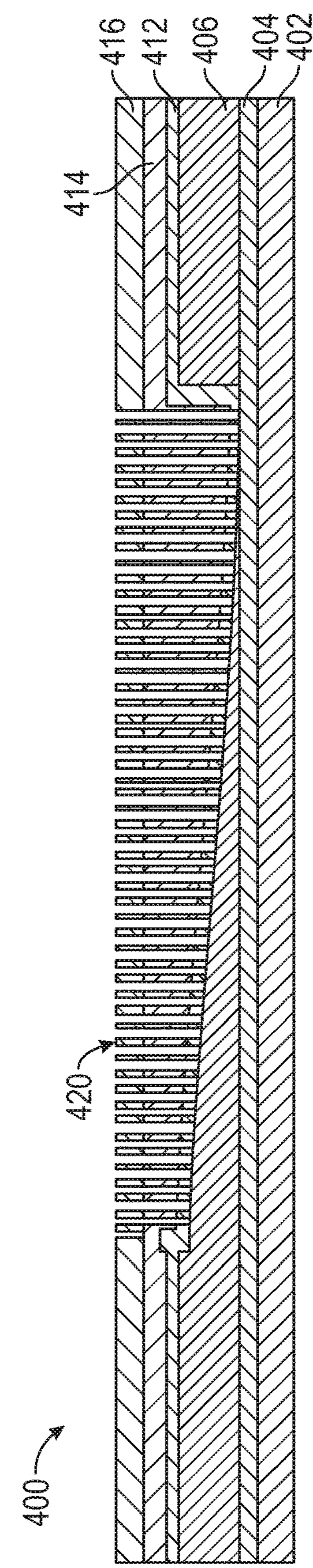

At operation 312, lithography is performed and then the hardmask 412 is etched. The results of operation 312 are illustrated in FIG. 4F. For the lithography, a dry scanner may be used to define grating lines 420. Other solutions may be used in other embodiments. A variety of lithography tools or methods may be used depending on the target application. The hardmask 412 may be etched using an etch tool. Etching the photoresist stack patterns the hardmask 412. The hardmask 412 functions as a pattern guide for formation of the slanted grating structures. The grating lines 420 in FIG. 4F may be vertical or may be slanted (e.g., angled relative to vertical). During the lithography process, the grating lines may be made in varying widths and spacings, such that more grating lines 420 are defined or less grating lines 420 are defined.

Figure 4G:
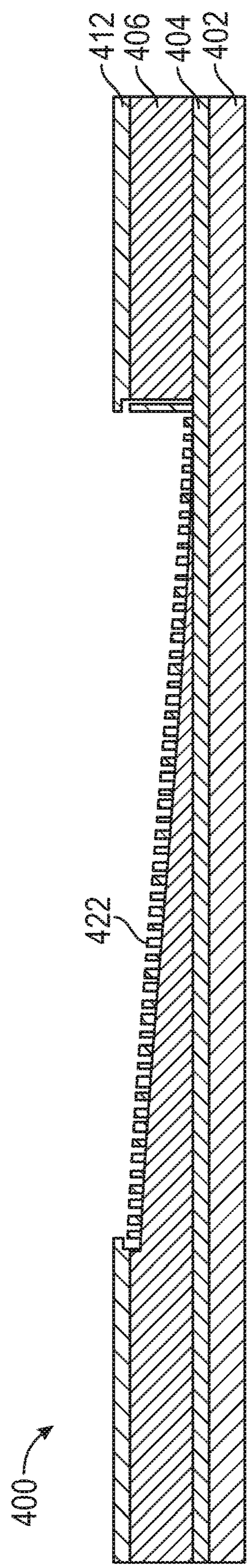

At operation 314, the optical planarization layer 414 and the photoresist layer 416 are stripped. The results of operation 314 are shown in FIG. 4G. Stripping the optical planarization layer 414 and the photoresist layer 416 yields a set of first structures 422, that are similar to the grating lines of operation 312.

Figure 4H:
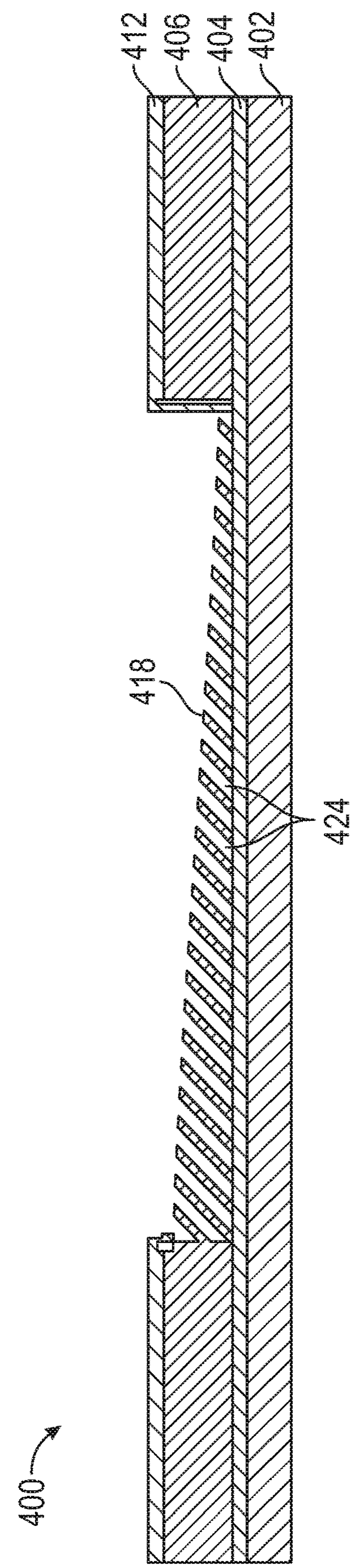

At operation 316, a slant etch is performed to create the grating structures 418 in the grating layer 406. The results of operation 316 are illustrated in FIG. 4H. The slant etch creates a plurality of channels 424, similar to the channels 204 in FIG. 2, which at least partially define a portion of the plurality of grating structures 418. The first structures 422 created in operation 314 are a top portion of the grating structures 418, and a bottom portion of the grating structures 418 is created in operation 316 and partially defined by a channels 424. In one example embodiment a ribbon beam etcher is used. Any suitable etching process may be utilized.

At operation 318, an optional operation may be performed to strip the hardmask 412. A wet clean may be performed in some embodiments.

Figure 5A:
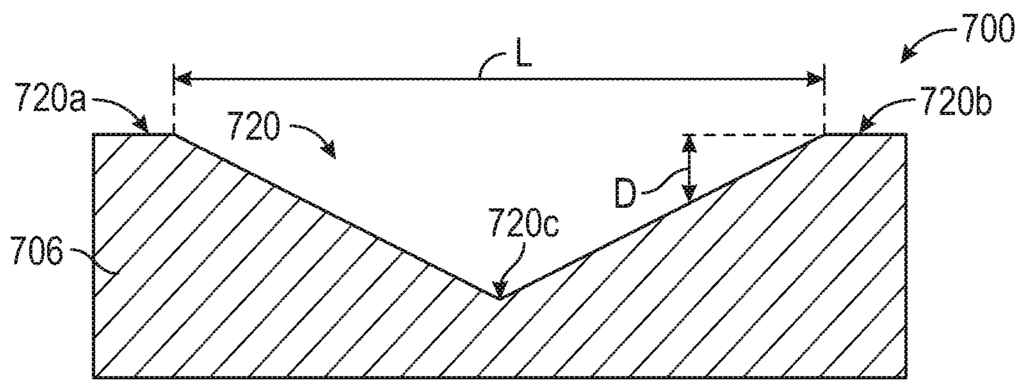
FIGS. 5A-5C are cross-sectional enlargements of examples of shapes of a wedge-shaped structure.
Figure 5B:
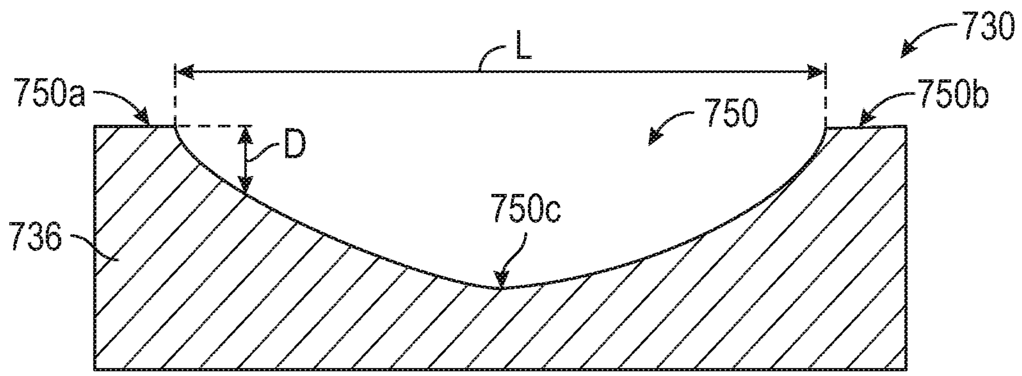
Figure 5C:
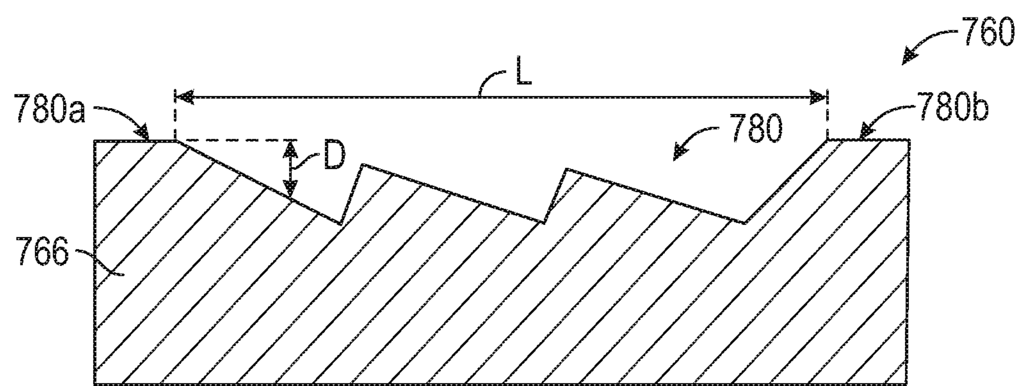

The etching process described herein advantageously allows the wedge-shaped structure to have a slope and/or curvature in one or more directions. FIGS. 5A-5C illustrate other examples of shapes that can be used for the wedge-shaped structure. FIG. 5A illustrates a wedge-shaped structure 720 in a grating layer 706 of a waveguide structure 700. The wedge-shaped structure 720 has two planar sloped portions which extend from respective peripheral regions 720*a*, 720*b* towards a central region 720*c*. FIG. 5B illustrates a wedge-shaped structure 750 in a grating layer 736 of a waveguide structure 730. The wedge-shaped structure 750 is a curved structure which has a shallow depth D at peripheral regions 750*a*, 750*b* and an increased depth at a central region 750*c*. In one example, the wedge-shaped structure 750 has a parabolic shape. The depth D increases non-linearly from the peripheral regions 750*a*, 750*b* to the central region 750*c*. FIG. 5C illustrates a wedge-shaped structure 780 in a grating layer 766 of a waveguide structure 760. The wedge-shaped structure 780 has a depth D that oscillates from a first end 780*a* to a second end 780*b* which forms a pattern of cyclical depths D for the wedge-shaped structure 780. The wedge-shaped structure 780 is shown with linear, saw-tooth oscillations of the depth D. However, it is contemplated that the depth D can vary non-linearly so that the wedge-shaped structure has wave-like oscillations in the depth D. The depth D of a wedge-shaped structure, such as wedge-shapes structures 720, 750, 780 can change linearly or non-linearly across a length L thereof from a first end (i.e., 720*a*, 750*a*, 780*a*) to a second end (i.e., 720*b*, 750*b*, 780*b*). Utilizing grayscale lithography and the techniques described herein, wedge-shaped structures of varying shapes can be patterned with a single pass instead of multiple operations as required by prior techniques.

Figure 6A:
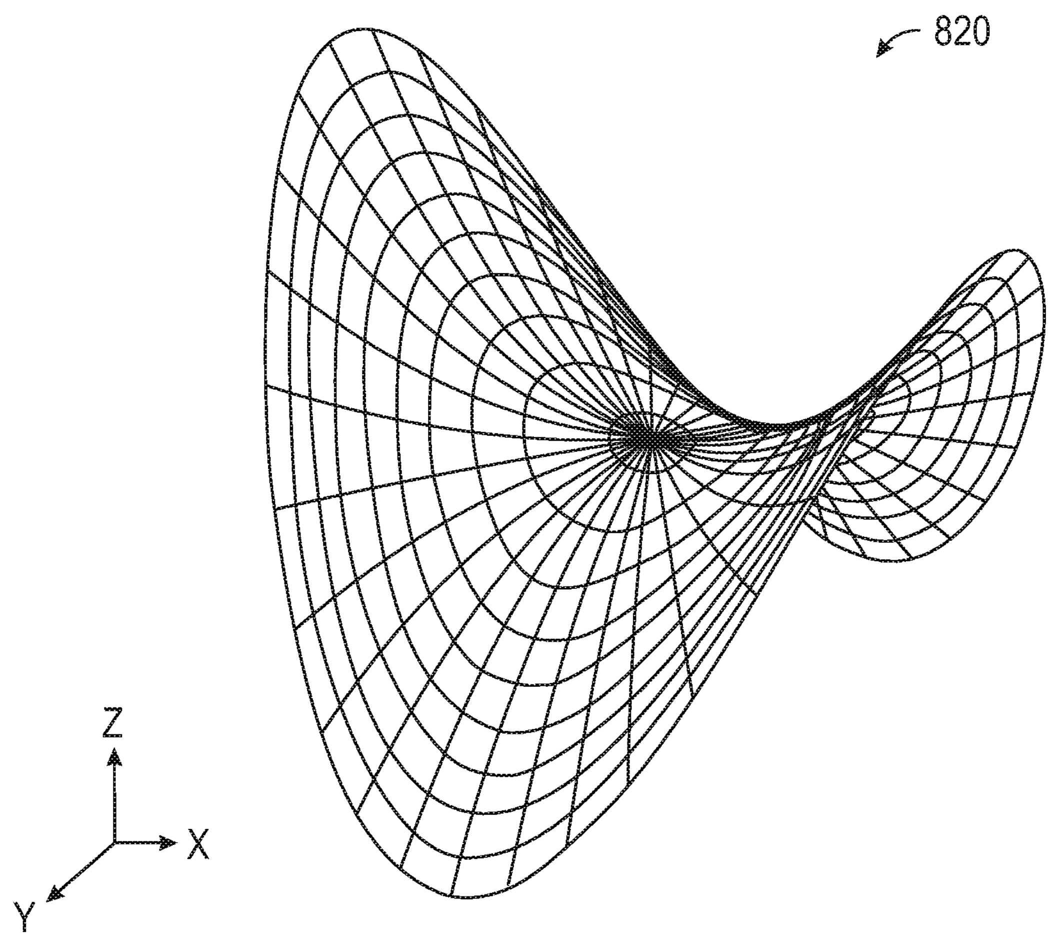
FIGS. 6A-6C are perspective views of examples of three dimensional shapes of a wedge-shaped structure.
Figure 6B:
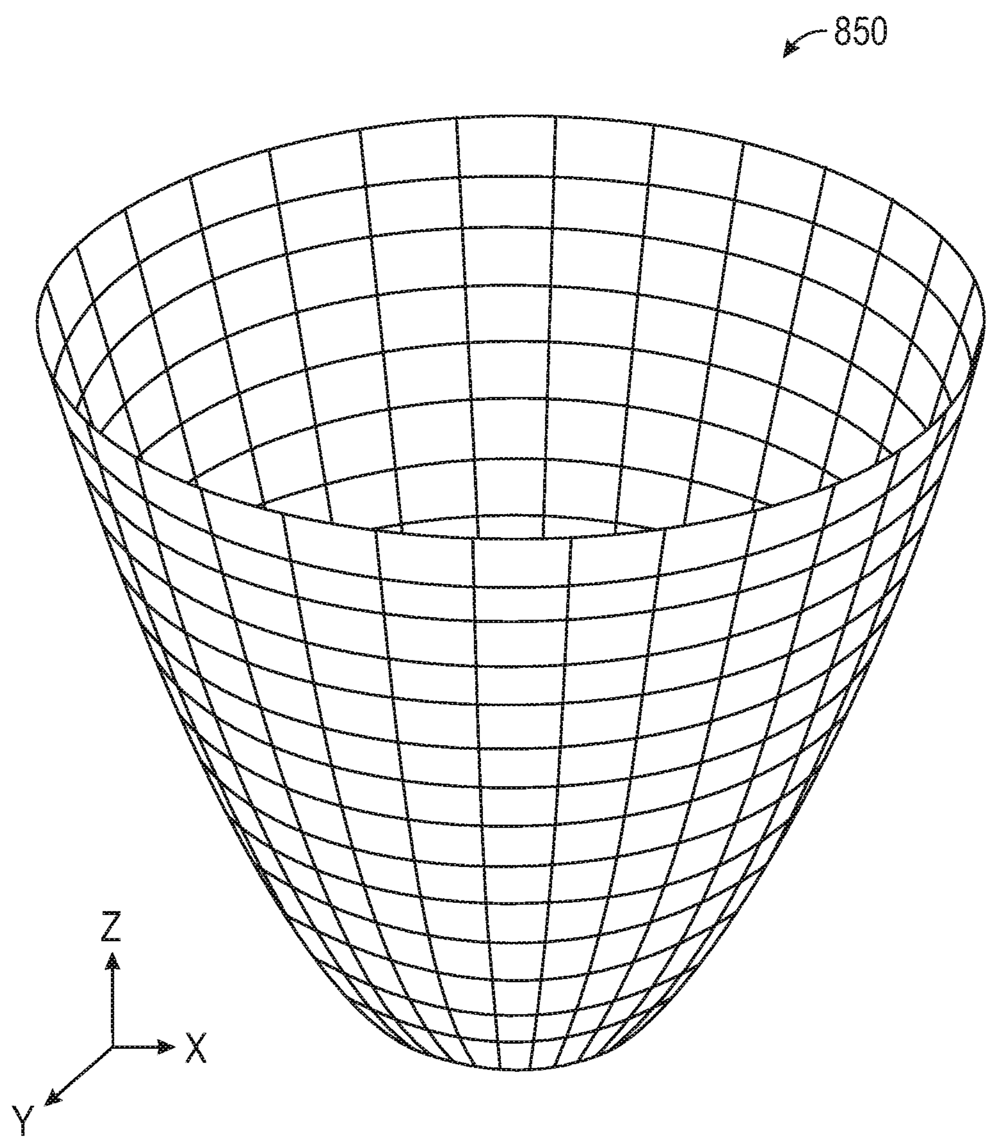
Figure 6C:
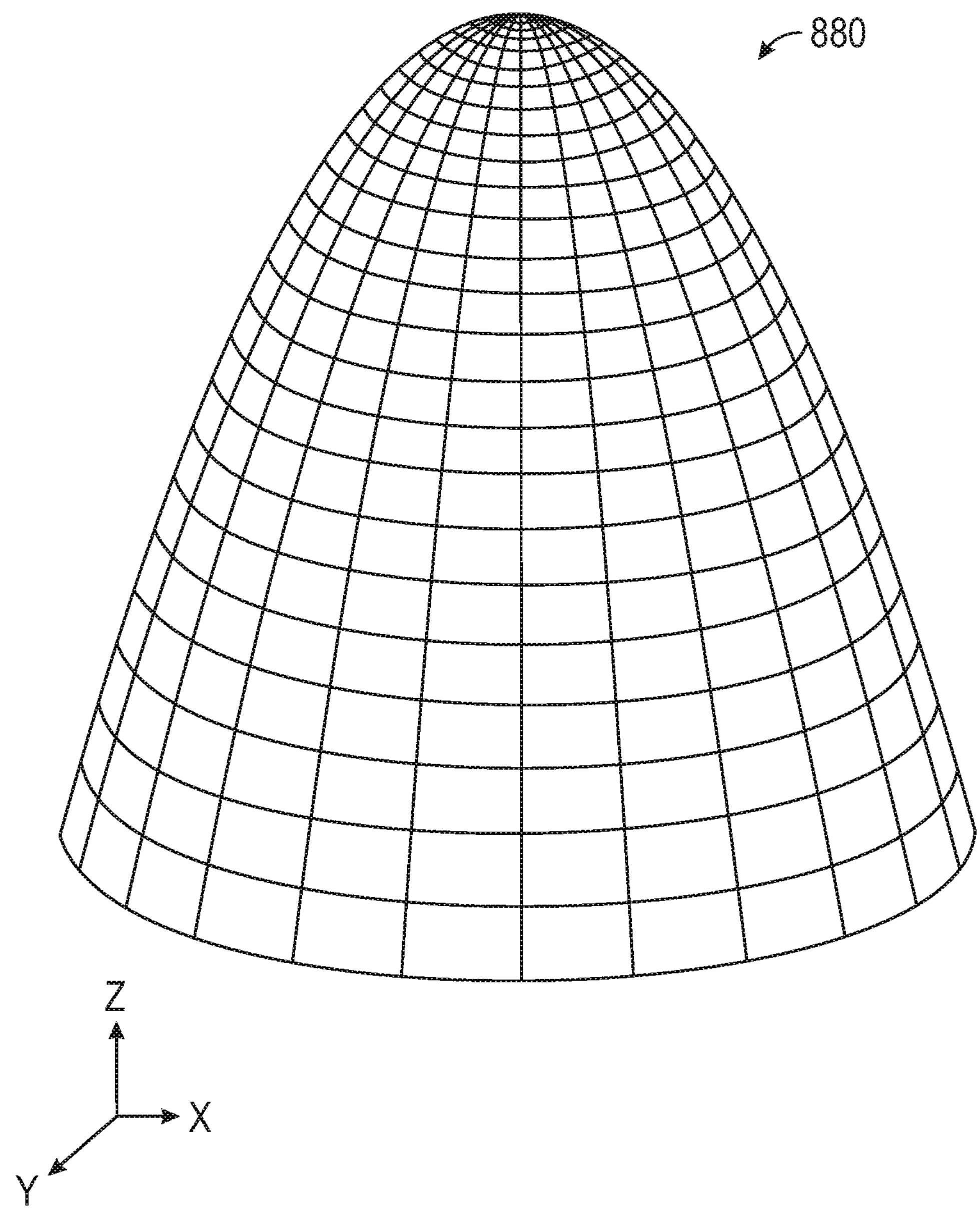

In another example, the wedge-shaped structure has a three dimensional shape. That is, the depth changes in multiple directions (i.e., a first direction X and a second direction Y) as illustrated in the examples of FIGS. 6A-6C. FIG. 6A illustrates a wedge-shaped structure 820 which has a saddle-point shaped curvature (i.e., hyperbolic paraboloid shape). FIG. 6B illustrates a wedge shaped-structure 850 which has an elliptic paraboloid shape with positive curvature. FIG. 6C illustrates a wedge shaped-structure 880 which has an elliptic paraboloid shape with negative curvature. The three dimensional shape of the wedge-shaped structure is not limited to the examples of FIGS. 6A-6C. Other desired shapes, for example a paraboloid in a square domain with positive curvature or negative curvature, an ellipsoid, and linear sloped shapes, among others, are also contemplated and can be used herewith. In these cases, the depth of the wedge-shaped structure changes in both the X and Y directions. Thus, upper surfaces of the slanted grating structures are curved as defined by the shape of the curvature of the wedge-shaped structure.

By utilizing the embodiments described herein, a waveguide structure having grating structures comprising any pattern, such as slanted grating structures, is formed. In a waveguide embodiment, the slanted grating structures improve the function of the waveguide by better collecting and directing light passing through the waveguide thereby improving clarity of a projected image. The slanted grating structures provide increased control over the wavelengths of light projected to a desired image plane. The uniformity of the power of light outcoupled by the waveguide is significantly more uniform. The embodiments described herein further improve manufacturing of a waveguide structure by eliminating manufacturing processes, such as mechanical polishing, which can damage layers used to form the waveguide structure. Further, the embodiments described herein utilize grayscale lithography to create a grating that has a two dimensional or a three dimensional shape which allow use of the waveguide structure in an increased range of applications. For example, in other embodiments, the methods described herein are used to create a master for nanoimprint lithography.

While the foregoing is directed to embodiments of the present disclosure, other and further embodiments of the disclosure may be devised without departing from the basic scope thereof, and the scope thereof is determined by the claims that follow.

What is claimed is:

1. A waveguide structure, comprising:
- a substrate having a grating layer thereon;
- a wedge-shaped structure formed in the grating layer; and
- a plurality of channels formed in the grating layer, each channel partially defining a plurality of grating structures, wherein the plurality of channels are formed by a process comprising:
  - forming a wedge-shaped structure in the grating layer;
  - disposing a hardmask over the grating layer and a photoresist over the hardmask, the photoresist having an optical planarization layer (OPL) disposed thereunder;
  - forming grating lines, the forming of grating lines comprising:

performing a lithography process to pattern the photoresist to expose OPL portions of the OPL; and
removing the OPL portions exposed by the photoresist to form grating lines of the photoresist and OPL, wherein adjacent grating lines expose portions of the hardmask;
etching the portions of the hardmask to expose the wedge-shaped structure in the grating layer; and
etching exposed grating layer portions of the wedge-shaped structure to form the plurality of channels in the grating layer.

2. The structure of claim 1, wherein a depth of the wedge-shaped structure changes linearly in a first direction and a second direction.

3. The structure of claim 1, wherein a depth of the wedge-shaped structure changes non-linearly in a first direction and a second direction.

4. The structure of claim 1, wherein each grating structure of the plurality of grating structures has a depth in a range of about 5 nm to about 700 nm.

5. The structure of claim 1, wherein each grating structure of the plurality of grating structures is slanted at an angle in a range of about 0 degrees to about 70 degrees relative to a plane that is normal to a surface of an etch stop layer.

6. The structure of claim 1, wherein the grating layer is formed from an optically transparent material having a refractive index of about 1.3 or higher.

7. The structure of claim 1, wherein the wedge-shaped structure has a saddle-point shape.

8. The structure of claim 1, wherein the wedge-shaped structure has an elliptic paraboloid shape with positive curvature.

9. A method of forming a waveguide structure comprising:
forming a wedge-shaped structure in a resist layer using grayscale lithography, the resist layer disposed over a grating layer;
performing a transfer etch process to form the wedge-shaped structure in the grating layer;
disposing a hardmask over the grating layer and a photoresist over the hardmask, the photoresist having an optical planarization layer (OPL) disposed thereunder, the OPL having a planar top surface;
forming grating lines, the forming of grating lines comprising:
performing a lithography process to pattern the photoresist to expose OPL portions of the OPL; and
removing the OPL portions exposed by the photoresist to form grating lines of the photoresist and OPL, wherein adjacent grating lines expose portions of the hardmask;
etching the portions of the hardmask to expose the wedge-shaped structure in the grating layer; and
etching exposed grating layer portions of the wedge-shaped structure to form a plurality of grating structures in the grating layer.

10. The method of claim 9, wherein the wedge-shaped structure changes in depth along:
a first direction, a depth at peripheral regions of the wedge-shaped structure greater than a depth at a central region of the wedge-shaped structure; and
a second direction, a depth at the peripheral regions of the wedge-shaped structure is greater than a depth at the central region of the wedge-shaped structure, wherein the first direction is perpendicular to the second direction.

11. The method of claim 10, wherein the depth of the wedge-shaped structure changes linearly in the first direction and the second direction.

12. The method of claim 10, wherein the depth of the wedge-shaped structure changes non-linearly in the first direction and the second direction.

13. A method of forming a waveguide structure comprising:
forming a wedge-shaped structure in a resist layer using grayscale lithography, the resist layer disposed over a grating layer;
performing a transfer etch process to form the wedge-shaped structure in the grating layer;
disposing a hardmask over the grating layer and a photoresist over the hardmask, the photoresist having an optical planarization layer (OPL) disposed thereunder, the OPL having a planar top surface;
forming grating lines, the forming of grating lines comprising:
performing a lithography process to pattern the photoresist to expose OPL portions of the OPL; and
removing the OPL portions exposed by the photoresist to form grating lines of the photoresist and OPL, wherein adjacent grating lines expose portions of the hardmask;
etching the portions of the hardmask to expose the wedge-shaped structure in the grating layer; and
etching exposed grating layer portions of the wedge-shaped structure with a slant etch process to form a plurality of grating structures in the grating layer.

14. A method of forming a waveguide structure comprising:
forming a wedge-shaped structure in a grating layer;
disposing a hardmask over the grating layer and a photoresist over the hardmask, the photoresist having an optical planarization layer (OPL) disposed thereunder;
forming grating lines, the forming of grating lines comprising:
performing a lithography process to pattern the photoresist to expose OPL portions of the OPL; and
removing the OPL portions exposed by the photoresist to form grating lines of the photoresist and OPL, wherein adjacent grating lines expose portions of the hardmask;
etching the portions of the hardmask to expose the wedge-shaped structure in the grating layer; and
etching exposed grating layer portions of the wedge-shaped structure to form a plurality of grating structures in the grating layer.

15. The method of claim 14, wherein the wedge-shaped structure changes in depth along:
a first direction, a depth at peripheral regions of the wedge-shaped structure greater than a depth at a central region of the wedge-shaped structure; and
a second direction, a depth at the peripheral regions of the wedge-shaped structure is greater than a depth at the central region of the wedge-shaped structure, wherein the first direction is perpendicular to the second direction.

16. The method of claim 14, wherein a depth of the wedge-shaped structure changes linearly in a first direction and a second direction.

17. The method of claim 14, wherein a depth of the wedge-shaped structure changes non-linearly in a first direction and a second direction.

* * * * *